(12) United States Patent
Milliner et al.

(10) Patent No.: US 8,243,843 B2
(45) Date of Patent: Aug. 14, 2012

(54) SYSTEMS AND METHODS FOR LOW-COMPLEXITY MIMO DETECTION USING LEAF-NODE PREDICTION VIA LOOK-UP TABLES

(75) Inventors: David L. Milliner, New Orleans, LA (US); Deric W. Waters, Dallas, TX (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/079,944

(22) Filed: Apr. 5, 2011

(65) Prior Publication Data

US 2011/0176642 A1    Jul. 21, 2011

Related U.S. Application Data

(62) Division of application No. 12/016,921, filed on Jan. 18, 2008.

(60) Provisional application No. 60/887,241, filed on Jan. 30, 2007, provisional application No. 60/887,235, filed on Jan. 30, 2007.

(51) Int. Cl.
*H04B 7/02* (2006.01)

(52) U.S. Cl. ........ 375/267; 375/260; 375/262; 375/299; 375/341; 375/349

(58) Field of Classification Search .................. 375/267, 375/260, 262, 299, 341, 349
See application file for complete search history.

(56) References Cited

U.S. PATENT DOCUMENTS

2008/0075022 A1* 3/2008 Lei et al. ...................... 370/310
* cited by examiner

*Primary Examiner* — Kabir A Timory
(74) *Attorney, Agent, or Firm* — Steven A. Shaw; W. James Brady; Frederick J. Telecky, Jr.

(57) ABSTRACT

A method for building a look-up table for a receiver in a multiple-input multiple-output (MIMO) detection system simulates a MIMO detector over many channel realizations, tracks channel metric and parameter values used for each channel realization resulting from such simulating, and stores, in a look-up table, best values of the tracked values used for a particular channel metric.

4 Claims, 8 Drawing Sheets

SYSTEMS AND METHODS FOR LOW-COMPLEXITY MIMO DETECTION USING LEAF-NODE PREDICTION VIA LOOK-UP TABLES

CROSS-REFERENCE TO RELATED APPLICATIONS

The present application claims priority to U.S. patent application Ser. No. 12/016,921, filed Jan. 18, 2008, which claims priority to U.S. provisional patent application Ser. No. 60/887,241, filed Jan. 30, 2007, and entitled "Low-Complexity MIMO Detection with Analytical Leaf-Node Prediction", and to U.S. provisional patent application Ser. No. 60/887,235, filed Jan. 30, 2007 and entitled "Low-Complexity MIMO Detection using Leaf-Node Prediction via Look-Up Tables", both hereby incorporated in their entirety herein by reference.

BACKGROUND

As consumer demand for high data rate applications, such as streaming video, expands, technology providers are forced to adopt new technologies to provide the necessary bandwidth. Multiple Input Multiple Output ("MIMO") is an advanced technology that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas.

Many multiple-input multiple-output (MIMO) detection algorithms have been previously proposed in the literature. The optimal algorithm is conceptually simple, but is often impractical due to the fact that its complexity increases exponentially with the number of channel inputs. As a result, many algorithms have been proposed to solve the problem with less complexity, with the unfortunate effect of also significantly sacrificing performance.

Many MIMO detectors have been proposed and implemented as exclusively hard detectors that only give the final estimate of the channel input. Most notable is the sphere decoding detector because it can achieve Max-Log performance in an uncoded system with much less complexity on average. A summary of many MIMO detectors may be found in D. W. Waters, "Signal Detection Strategies and Algorithms for multiple-Input Multiple-Output Channels", Georgia Institute of Technology, PhD dissertation, December 2005, including many variations of the sphere detector that minimize complexity without sacrificing performance. At least one list-sphere detector computes the log-likelihood ratio (LLR) for a channel input. Unfortunately, implementing a list-sphere detector is still quite complex, requiring significant processing resources.

Improvements are desired to achieve a favorable performance-complexity trade-off compared to existing MIMO detectors.

BRIEF DESCRIPTION OF THE DRAWINGS

For a detailed description of exemplary embodiments of the invention, reference will be made to the accompanying drawings in which.

NOTATION AND NOMENCLATURE

Certain terms are used throughout the following description and claims to refer to particular system components. As one skilled in the art will appreciate, computer companies may refer to a component by different names. This document doe not intend to distinguish between components that differ in name but not function. In the following discussion and in the claims, the terms "including" and "comprising" are used in an open-ended fashion, and thus should be interpreted to mean "including, but not limited to . . . ."Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

It should be understood at the outset that although exemplary implementations of embodiments of the disclosure are illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

In light of the foregoing background, embodiments enable improved multiple-input multiple-output (MIMO) detection with a favorable performance-complexity trade-off compared to the Maximum-Likelihood (ML) detector and other existing MIMO detectors. For example, some embodiments for predicting the best leaf-nodes for a given channel and generating a candidate list are presented that are based on optimizing the probability that the channel input with lowest mean-squared error is among the candidate vectors enumerated. Embodiments more easily generate better look-up tables by employing Leaf-Node Prediction (LNP) and by optimizing performance metrics. It will be appreciated by those skilled in the art, that a metric indicates whether a channel characteristic is good or bad for channel transmission, i.e., it is hard to perform detection correctly if a channel metric is bad or poor. Moreover, embodiments of a LNP detector may be used as a way to generate a list of candidate vectors, or its list may be used to directly compute LLR values.

Although embodiments will be described for the sake of simplicity with respect to wireless communication systems, it should be appreciated that embodiments are not so limited, and can be employed in a variety of communication systems.

To better understand embodiments of this disclosure, it should be appreciated that the MIMO detection problem—namely, to recover the channel inputs given the channel outputs when there are multiple inputs and outputs—can be described using a narrowband channel model written as:

$$r = Ha + w, \quad (1)$$

where H is an M×N channel matrix, a is a signal vector such that $a=[a_1, a_2 \ldots a_N]^T$ is an N dimensional vector of symbols that may be drawn from different alphabets, and the noise has the autocorrelation matrix $E[ww^*]=\Sigma^2$. Although the present discussion focuses on the case where $\Sigma^2=I\sigma^2$, it should be understood that embodiments are extendable to the more general case. For example, the channel outputs may be scaled so that the noise components have the same variance. The narrowband channel model can be applied to broadband channels when orthogonal frequency division multiplexing (OFDM) is used. In the OFDM case, each subcarrier is modeled according equation (1). Thus, the algorithms disclosed here can easily be extended to apply to broadband channels.

One way to implement a ML detector uses a QR decomposition (also known as a QR factorization) of the channel. This decomposition is defined as follows:

$$\begin{bmatrix} H \\ \alpha\hat{\sigma}I \end{bmatrix} \Pi = \begin{bmatrix} Q \\ \alpha\hat{\sigma}\Pi R^{-1} \end{bmatrix} R \quad (2)$$
$$= \tilde{Q}R,$$

where $\tilde{Q}$ is an (M+N)×N matrix with orthonormal columns, R is an N×N triangular matrix with positive and real diagonals, $\Pi$ is an N×N permutation matrix, $\hat{\sigma}$ is an estimate of $\sigma$, and $\alpha$ is a chosen parameter. Although the present discussion describes embodiments assuming a lower triangular R matrix, it should be understood that embodiments can easily be extended to describe an upper triangular matrix instead. A common special case of the QR decomposition may be written as:

$$H\Pi = QR, \quad (3)$$

when $\alpha = 0$.

The optimal value of the parameter $\alpha$ depends on the type of MIMO detector that is used. For example, and not by way of limitation, $\alpha=1$ is optimal for a linear receiver because it minimizes the mean squared error (MSE), $\|R^{-1}Q^H y - s\|^2$. On the other hand, $\alpha=0$ is optimal for a ML receiver. It will be appreciated that in general the parameter $\alpha$ can take on any value.

The way the permutation matrix $\Pi$ is defined impacts performance for some MIMO detectors. For example, and not by way of limitation, BLAST ordering chooses $\Pi$ to maximize the minimum diagonal of R. A less complex way to choose $\Pi$ is the sorted-QR decomposition that attempts to maximize $R_{1,1}$ (lower triangular R). Embodiments of LNP detection can work with any permutation matrix.

Thus, the MIMO detector problem can be simplified by creating an effective channel that is triangular. The process of creating an effective channel that is triangular is called MIMO equalization. One such method of triangularizing a channel uses the conjugate transpose of Q (resulting from the QR decomposition of the channel H) as follows:

$$y = Q^H r = Rs + n \quad (4)$$

where $s = \Pi^{-1} a = [s_1\ s_2\ \ldots\ s_N]^T$ is a permutation of the channel input vector, n is an effective noise, and the superscript H denotes the conjugate transpose operation. Note that n may be a function of $\alpha$ when $\alpha \neq 0$. The constellation for the i-th symbol is defined as $s_i \in A_i$. The set containing all valid channel inputs is denoted as $A_1^N$, this means $s \in A_1^N$. The notation $A_1^N(k,i,j)$ may be employed to denote the set of all valid channel inputs s whose j-th bit in the i-th symbol maps to the value k.

Other MIMO equalization techniques that do not use QR decomposition may also be used. For example, methods based on the Cholesky decomposition of H do not require the computation of Q. The Cholesky decomposition can compute R without computing Q. The equalization output in this case may be computed as:

$$y = R^{-1} H^H r = Rs + n \quad (5)$$

The output of a ML detector is the log-likelihood ratio (LLR) of each bit transmitted in the vector s. The LLR value indicates the probability that a given bit was transmitted as a one or zero. The ML detector output for the j-th bit of the i-th symbol is described by a single equation:

$$\lambda_{i,j} = (\|r - H\Pi s^{(0)}\|^2 - \|r - H\Pi s^{(1)}\|^2)/\hat{\sigma}^2, \quad (6)$$

where $\|r - H\Pi s^{(k)}\|^2$ is minimized under the constraint that $s^{(k)} \in A_1^N(k,i,j)$. It should be understood that this is only one example of how an LLR may be computed, and should not be used as a limitation on the embodiments disclosed or invention claimed. Also, the value $\|r - H\Pi x\|^2$ is defined as the mean-squared error (MSE) of the vector x. The mean-squared error is one kind of cost that can be used for processing the signal.

The ML detector may also be defined using the equivalent triangular channel model:

$$\lambda_{i,j} = (\|y - Rs^{(0)}\|^2 - \|y - Rs^{(1)}\|^2)/\hat{\sigma}^2, \quad (7)$$

where $\|y - Rs^{(k)}\|^2$ is minimized subject to the constraints $s^{(k)} \in A_1^N(k,i,j)$, and $\alpha=0$, and where $\Pi$ can be any permutation matrix. Note that $\|y - Rx\|^2 = \|r - H\Pi x\|^2$ when $\alpha=0$.

Many MIMO detectors are classified as list detectors. A list detector is any detector that generates a list of candidate vectors for the channel input. The set of candidate vectors is labeled as the set $\mathcal{L}$, and the number of candidates in the set is called the list length L. The ML detector is a list detector with an exhaustive list. It is desirable for list detectors to generate their lists to be as small as possible without sacrificing too much performance. One example of a high-performing list detector is called the list-sphere detector. For a given channel realization, a list-sphere detector computes its list $\mathcal{L}$ such that each of the L candidate vectors it contains has a smaller MSE $\|r-H\Pi\hat{s}\|^2$ than any possible channel input outside the list $\mathcal{L}$, i.e. $\|r-H\Pi\hat{s}\|^2 < \|r-H\Pi q\|^2$ for any $\hat{s} \in \mathcal{L}$ and $q \notin \mathcal{L}$.

Given the set $\mathcal{L}$ generated by any list detector, the LLR for the j-th bit of the i-th symbol may be computed in a manner similar to the ML detector in equations (6) and (7):

$$\lambda_{i,j} = (\|y-Rs^{(0)}\|^2 - \|y-Rs^{(1)}\|^2)/\hat{\sigma}^2, \quad (8)$$

where $\|y-Rs^{(k)}\|^2$ is minimized subject to the constraints $s^{(k)} \in A_1^N(k,i,j)$ and $s^{(k)} \in \mathcal{L}$. Therefore, minimizing the quantity $\|y-R\hat{a}\|^2$ over a range of possible values for the vector $\hat{a}$ is an important challenge for MIMO detection. This detection challenge is directly related to the probability $\Pr[y|a=\hat{a}]$, which can be fully described in terms of a tree search. The number of branches exiting the root node corresponds to the number of possible values for the first symbol. Likewise the number of branches exiting the nodes preceding the i-th level corresponds to the number of possibilities for the i-th symbol. In the end, there are $$\prod_{i=1}^{N} |A_i|$$

total leaf nodes in the tree. The "cost" of any node is the sum of the scores of all the branches in the path back to the root node, where every branch in the tree is associated with a unique score. The score of a branch exiting a node at the i-th level can be written as:

$$\text{Score} = |z_i - R_{i,i}\hat{s}_i|^2,$$

where $z_i$ is the result of an interference cancellation procedure. The interference cancellation procedure is defined as:

$$z_i = y_i - \sum_{j=1}^{i-1} R_{i,j}\hat{s}_j, \quad (9)$$

where $y_i$ is defined by equation (4), and $[\hat{s}_1 \ldots \hat{s}_{i-1}]^T$ are the symbols from the path that connects the current branch back to the root node.

Figure 1:
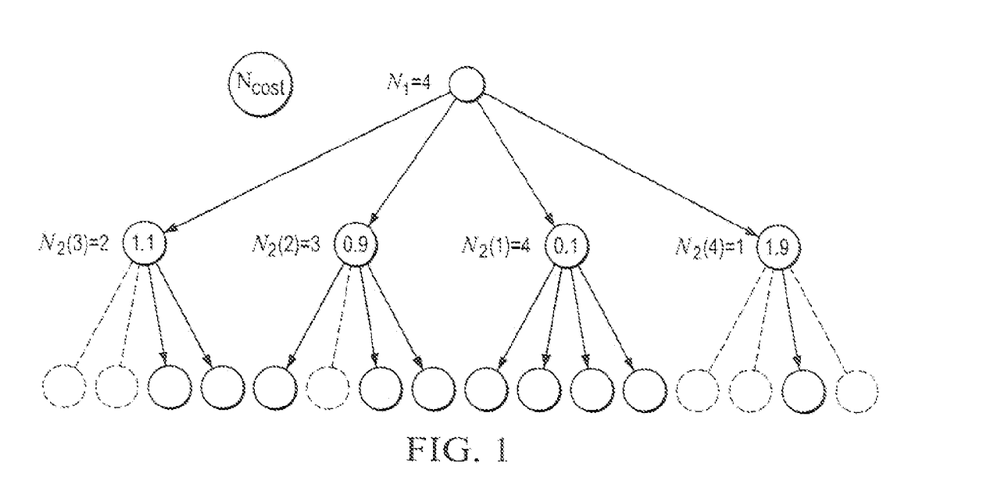
FIG. 1 illustrates an example tree diagram of branches enumerated by a Leaf-Node Prediction ("LNP") detector in which embodiments may be used to advantage.

FIG. 1 shows an example tree diagram with two levels (N=2) and four branches exiting each node (alphabet $A_i$ contains four elements). The branches illustrated were enumerated by an exemplary embodiment of a LNP detector that will be discussed later.

Figure 2:
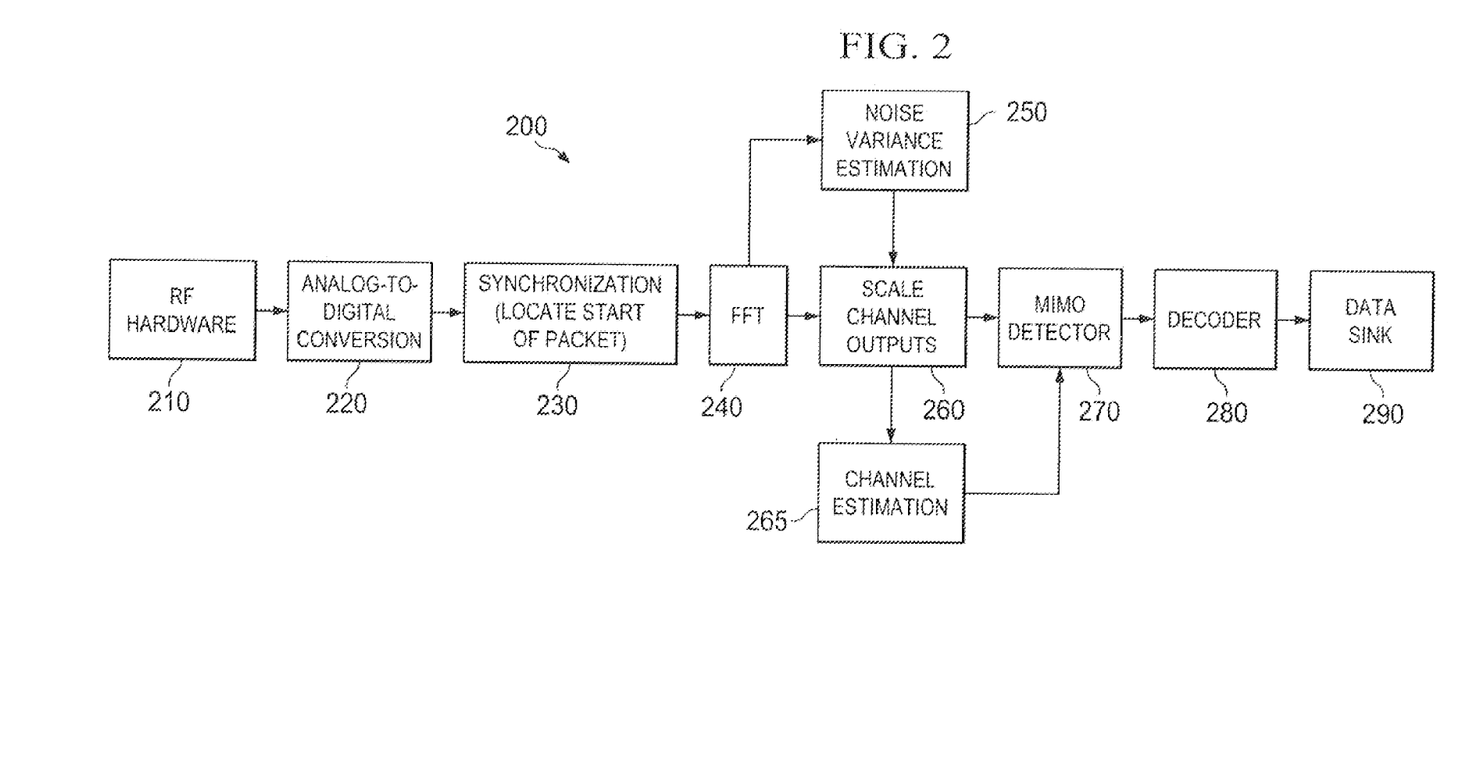
FIG. 2 illustrates a block diagram of an exemplary communication system comprising an exemplary MIMO detector.

FIG. 2 is a block diagram of an exemplary communication system comprising a MIMO detector. Specifically, a wireless (e.g., radio frequency) stream of information is received at RF hardware 210, converted to a digital stream at analog-to-digital converter 220, and synchronized at 230. At this point the start of the packet has been located, and the digital stream is passed through a fast-Fourier transformation at FFT 240. The output of FFT 240 is provided to estimator 250 which estimates the noise variance of the stream. The outputs of FFT 240 and estimator 250 are provided to scaler 260 where the channel stream is preferably scaled using the noise variance estimation on the transformed stream, and separated into components. The outputs of scaler 260 are preferably fed to channel estimator 265 which estimates the H matrix. Scaler 260 forwards channel output, r, and channel estimator 265 forwards the estimated H matrix to MIMO detector 270. MIMO detector 270, which will be described as comprising a LNP detector for portions of this discussion, generates LLR values which are in turn provided to decoder 280 for analysis and/or further processing. The output of decoder 280 is stored in data sink 290 which can be any form of memory now known or later developed.

It will be appreciated that application of a low-complexity leaf-node predictor is motivated by the fact that a list-sphere detector has excellent performance even with very small L. Unfortunately, the list-sphere detector requires high complexity to generate even a small list. The implication is that for a given channel realization, if the receiver knew beforehand which L leaf nodes had minimum cost then the MIMO detection problem solves with very low complexity. This is the goal of embodiments of a leaf-node predictor. Thus, embodiments predict the best candidates for the channel inputs and disregard other possible channel inputs to reduce complexity.

Figure 3:
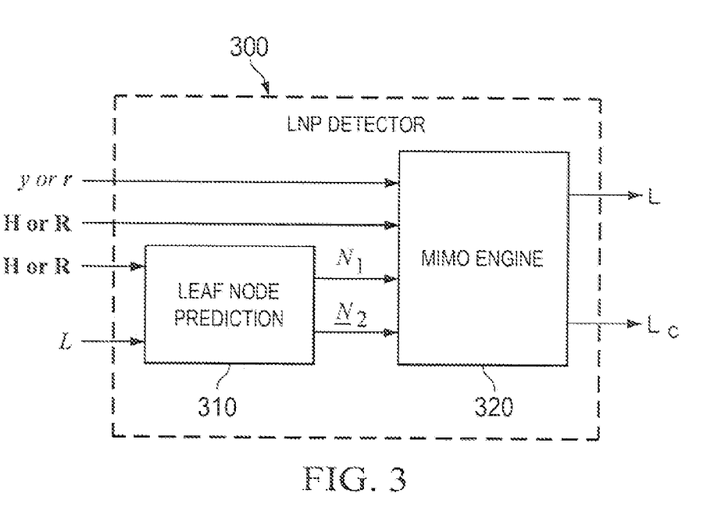
FIG. 3 shows a block diagram of an exemplary LNP detector in which embodiments may be used to advantage.

An LNP detector 300, consistent with embodiments, comprises at least two elements as illustrated in FIG. 3; namely, leaf node predictor 310 and MIMO engine 320. Leaf node predictor 310 predicts the best leaf nodes for a given channel realization—this is also sometimes referred to in this disclosure as Leaf-Node Prediction. MIMO engine 320 enumerates and outputs the set of predicted leaf nodes along with their costs. As such embodiments may comprise a portion of a MIMO detector within a receiver (e.g., FIG. 2), or embodiments may be employed as a new variety of list detector to be used in any applicable system. Predicting the best leaf nodes for a given channel realization enables LNP detector 300 to approach the performance of the list-sphere detector, but with less complexity.

The accuracy of the leaf-node predictor is the key to achieving good performance in the LNP detector 300 and so it deserves a careful explanation. First, all the inputs into leaf-node predictor 310 preferably include the maximum number of leaf-nodes to be enumerated and an estimate of the channel matrix. The number of leaf nodes that LNP detector 300 enumerates is an input parameter called the list length, denoted as L. The channel matrix input depends on the kind of MIMO equalization that has been implemented. For example, a MIMO equalization may be used, one example of which is described in equation (4), in which case the matrix input to leaf-node predictor 310 may be the matrix R. However, if no MIMO equalization has been used or if a different kind of QR decomposition has been implemented by the MIMO equalizer, then the input to the leaf-node predictor is an estimate of the matrix H. The outputs of leaf-node predictor 310 are the two parameters $N_1$ and $N_2$ to be used by the MIMO engine as described below. The parameter $N_1$ is the number of unique values of the first symbol represented in the list set of predicted best leaf nodes. The parameter $N_2 = [N_2(1) \ N_2(2) \ldots N_2(N_1)]$ represents the number of unique values of the second symbol there are for each unique value of the first symbol in the set of predicted best leaf nodes. In some embodiments each element in the vector are always equal, $N_2(i) = N_2(j)$; in such case it is sufficient to represent $N_2$ as a scalar, $N_2 = N_2(1)$. For convenience, $N_2$ may be referred to as a parameter in some portions of this disclosure, represented as a parameter scalar in other portions, and as a parameter vector in yet other portions of this disclosure. Ideally, leaf-node predictor 310 of LNP detector 300 outputs the parameters $N_1$ and $\underline{N_2}$ that yield the best performance under the constraint that $$L = \sum_{i=1}^{N_1} N_2(i).$$

This constraint is imposed by the input list length. It can be appreciated, that the list length impacts both the performance and complexity of LNP detector 300, and should be carefully chosen.

The job of leaf-node predictor 310 is to generate the parameters $N_1$ and $\underline{N_2}$ for a given list length and channel matrix. The goal of embodiments of the leaf-node predictor is to ensure that the actual channel input is one of the vectors in the output list $\mathcal{L}$. Each of the two symbols $s_1$ and $s_2$ as defined in equation (4) has a different probability of causing an error—an error means that the actual channel input is not in the list $\mathcal{L}$. Since an error can be caused when either symbol is wrong, minimizing the probability of an error means equalizing the probability that each symbol causes an error so that they are equally or approximately equally robust to errors. In channels where the first symbol is more prone to error, $N_1$ preferably should be larger because enumerating more values of the first symbol will make it more robust to errors. Leaf-node predictor 310 employs a channel metric generated from the channel matrix that measures the relative robustness to errors of the two symbols. Such a channel metric preferably indicates how many candidates for the first symbol are to be enumerated so that the resulting two symbols are equally robust to errors.

The channel metric is important to the leaf-node predictor 310. There are many possible channel metrics, but a preferable metric is a function of the diagonal elements of the R matrix from (2). Namely, the channel metric is preferably defined as:

$$h(H) = \frac{R_{2,2}^2}{R_{1,1}^2}, \quad (10)$$

but any function that has a one-to-one mapping with this ratio can also be used. For example $R_{1,1}/R_{2,2}$, $R_{2,2}/R_{1,1}$ or $R_{1,1}^2/R_{2,2}^2$. A smaller value of $R_{i,i}$ implies that the i-th symbol is more prone to errors. It will also be appreciated that a large value of h(H) implies that $N_1$ should be small, and a small value of h(H) implies that $N_1$ should be large when h(H) is defined as in equation (10). The channel metric (10) is shown to be a function of the channel matrix H through coefficients of the R matrix. When it comes to computing this channel metric, a QR decomposition is not necessary for all embodiments. For example, the channel metric may be computed directly as:

$$h(H) = \frac{\|\tilde{h}_2\|^4}{\|\tilde{h}_2\|^2\|\tilde{h}_1\|^2 - |\tilde{h}_2^H \tilde{h}_1|^2} = \frac{R_{2,2}^2}{R_{1,1}^2}, \quad (11)$$

where $[\tilde{h}_1\ \tilde{h}_2]=[_{\alpha\hat{\sigma}I}{}^H]\Pi$ or if $\alpha=0$ is chosen then $[\tilde{h}_1\ \tilde{h}_2]=H\Pi$ may be used instead.

Note that changing the parameters $\alpha$, $\Pi$, or $\hat{\sigma}$ of may also change this channel metric, which may be used to advantage. For example, by choosing the $\Pi$ that minimizes or maximizes the value of h(H) the range of values of the channel metric stored in a look-up table can be reduced.

Other alternative channel metrics are possible as well that are direct functions of H. Some examples are:
1. h(H)=ratio of eigenvalues of H. The eigenvalues can be computed, for example and not by way of limitation, from the well-known singular-value decomposition.
2. h(H)=ratio of column norms of H.

Any channel metric currently in existence or developed in the future may be employed by embodiments to implement the leaf-node predictor 310.

Figure 4A:
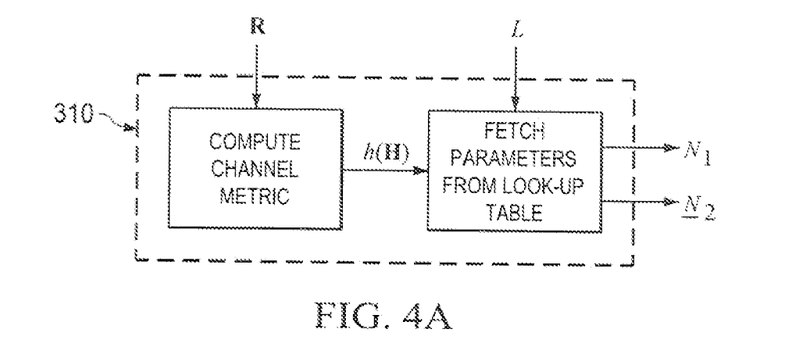
FIGS. 4a and 4b each illustrate a block diagram of an exemplary leaf-node predictor using a precomputed look-up table.

As illustrated in FIG. 4a, if the appropriate decomposition of H has already been computed elsewhere in the receiver, the decomposition need not be recomputed in the leaf-node predictor; the matrix R can be an input to the leaf-node predictor. On the other hand, in some embodiments the leaf-node predictor can compute a different version of the decomposition than the one used by the MIMO equalizer. In that case, the matrix H and other parameters useful to computing the desired decomposition are input to leaf-node predictor 310. In either case, the same channel metric is generated in the end.

Figure 4B:
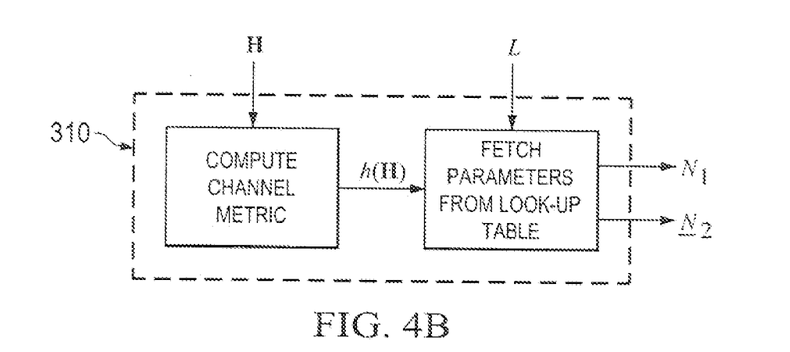
Figure 6A:
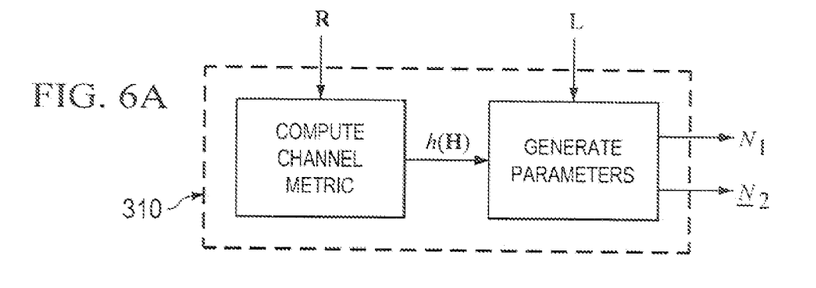
FIGS. 6a and 6b each illustrate a block diagram of an exemplary leaf-node predictor generate parameters without using a look-up table.
Figure 6B:
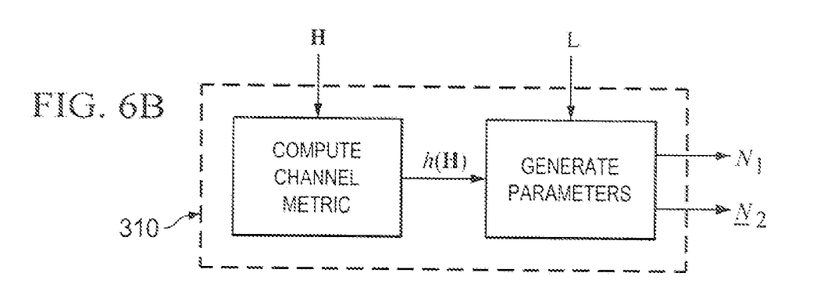

In alternative embodiments, when the leaf-node predictor is applied to different tones in an OFDM system, computing the channel metric for each individual tone may be avoided to reduce complexity. In this case, the channel metric is computed for some of the OFDM tones, then the channel metrics of the other tones are interpolated from the set of computed channel metrics. These embodiments, when compared with the embodiments of FIGS. 4b and 6b, would have $\{H_k\}$—as opposed to H—as input to the "Compute Channel Metric" block and as shown in FIGS. 4b and 6b, $h(H_k)$ is output, where $H_k$ is the channel matrix for the k-th tone, and $\{H_k\}$ is the set of channel matrices for all tones.

For a given channel metric h(H) there are varying embodiments to implementing leaf-node predictor 310. Embodiments of one type try to mimic another MIMO detector that is known to give good performance; such embodiments will be discussed herein as simulator-based leaf-node predictors. Here the term "mimic" means to achieve the same or very similar performance as another MIMO detector while using a different and much less complex method—e.g., in the current discussion, LNP detection. Embodiments of another type compute, determine or generate the parameters $N_1$ and $\underline{N_2}$ directly for a given channel metric; such embodiments will be discussed herein as analytically-based leaf-node predictors.

Figure 5:
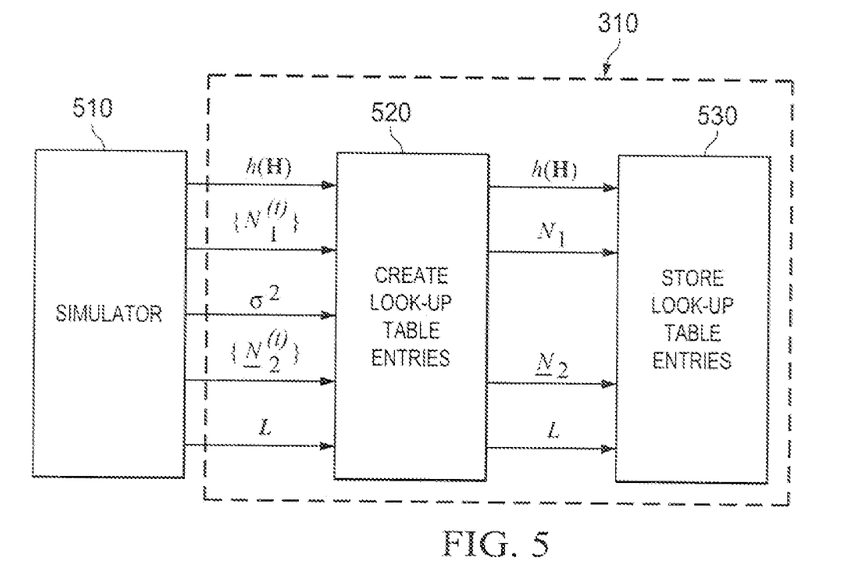
FIG. 5 illustrates a block diagram of an embodiment using a simulator to generate a look-up table.

Embodiments of simulation-based leaf-node prediction use a channel metric to mimic a MIMO detector that achieves satisfactory performance such as the list-sphere detector as illustrated in FIG. 5. Some embodiments achieve this by monitoring the MIMO detector over many channel realizations as it processes the data—this may be viewed as simulating the MIMO detector—and tracking the channel metric h(H) and the values of $N_1$ and $\underline{N_2}$ that the MIMO detector uses for each channel realization. The channel realizations may be generated from a mathematical model, or they could be recorded from an actual receiver. For an ideal channel metric, the values of the parameters $N_1$ and $\underline{N_2}$ are always the same for any two channels that have the same channel metric. However, one normally does not have a perfect channel metric; thus, a large set of simulations over many different channel realizations will yield a set of values $\{N_1^{(t)}\}$ and $\{\underline{N_2}^{(t)}=[N_2^{(t)}(1)\ N_2^{(t)}(2)\ \ldots\ N_2^{(t)(N_1^{(t)})}]\}$—one set of the parameters $N_1$ and $\underline{N_2}$ for each channel realization. Therefore, from this large set of simulation results, the best values of $N_1$ and $\underline{N_2}$ used for a particular value of the channel metric are selected to populate a look-up table (illustrated as "Create Look-Up Table Entries" 520 in FIG. 5) and can be stored in a look-up table ("Store Look-Up Table Entries" 530). A different look-up table is created for each value of L—the system may restrict the possible values of L to a set of at least one value. In addition, if the channel metric is a function of the noise variance, then the simulations should also encompass a range of noise variance values, $\sigma^2$ and a different set of look-up tables will be generated for each value of the noise variance. If the channel metric is not a function of the noise variance, then noise variance is not used. The best values of $N_1$ and $\underline{N}_2$ may be determined in a number of ways as long as $$L = \sum_{i=1}^{N_1} N_2(i).$$

Some examples, and not by way of limitation, are:
1. $N_1=\text{mean}\{N_1^{(t)}\}$ rounded to the nearest integer. And $N_2(i)=\text{mean}\{N_2^{(t)}(i)\}$ rounded to the nearest integer.
2. $N_1=\text{median}\{N_1^{(t)}\}$. And $N_2(i)=\text{median}\{N_2^{(t)}(i)\}$
3. $N_1=\max\{N_1^{(t)}\}$ and $\underline{N}_2$ is the corresponding vector from $\{\underline{N}_2^{(t)}\}$.

It should be understood that simulator 510 preferably includes the particular MIMO detector to be mimicked. It should also be appreciated that such look-up table creation is done off-line and in advance, then stored in the receiver. When leaf-node prediction subsequently occurs in the receiver, the channel metric for the given channel is computed and matched to the nearest channel metric stored in the look-up table. Then the parameters $N_1$ and $\underline{N}_2$ associated with the stored channel metric value are fetched and output by leaf-node predictor 310 (FIG. 4a). Embodiments of analytically-based leaf-node prediction analytically generate the parameters $N_1$ and $\underline{N}_2$ directly from a given channel metric. To better understand these embodiments, a mathematical basis for computations will be discussed. After defining the computation of $N_1$ and $\underline{N}_2$ from the channel metric, embodiments of leaf-node predictor 310 may be implemented in at least two ways. In some embodiments, the computation is used to construct a look-up table that is used according to embodiments illustrated in FIGS. 4a and 4b. Such embodiments provide an easier way of constructing the look-up table than the simulation-based embodiments. Other embodiments compute, determine or generate $N_1$ and $\underline{N}_2$ in real-time for each channel according to embodiments illustrated in FIGS. 6a and 6b. In general, it will be appreciated, an algorithm that is only used in advance to compute a look-up table may be more complex than an algorithm to be executed in real-time.

To reduce the size of the look-up table it is possible to sparsely populate it. Specifically, that means that not all possible values of $N_1$ are represented in the look-up table. Then after computing the channel metric, the value of $N_1$ to be used is interpolated from the values of $N_1$ associated with the channel metrics that are stored in the look-up table. The values of $\underline{N}_2$ may be likewise interpolated.

Although there are many possible channel metrics, for simplicity's sake, embodiments will be discussed that preferably choose the parameters $N_1$ and $\underline{N}_2$ based on the probability that the list contains the channel input with lowest MSE. While this approach was selected in order to approximate a list-sphere detector, it should be appreciated that the channel metric may be otherwise selected. It has been found that the best MIMO engine inputs optimize $P_c$, i.e., the probability that the list contains the channel input with lowest MSE. The vector with the smallest MSE is preferably referred to as $s_b$, since it is the best estimate of the channel input, i.e. $\|r-H\Pi s_b\|^2 \leq \|r-H\Pi q\|^2$ for any $q \in A_1^N$. This probability can be defined as:

$$P_c = Pr(s_b \in \mathcal{L}), \tag{12}$$

where $\mathcal{L}$ is the set of candidate vectors output by MIMO engine 320 that corresponds to the set of leaf nodes output by leaf-node predictor 310. This probability metric definition can be rewritten as:

$$P_c Pr(\overline{G}_1 \cup \overline{G}_2 \cup \ldots \cup \overline{G}_{n_1}) = \sum_{i=1}^{n_1} Pr(\overline{G}_i)$$

where $\overline{G}_i$ denotes the event that the i-th group of candidates contains $s_b$, and all candidates in the i-th group have; $\hat{s}_1^{(i)}$ as their first element. The summation holds because only one group of candidates can contain $s_b$.

The following mathematical development is only to help, by example and not by way of limitation, in the derivation of at least some leaf-node prediction embodiments. To begin simplifying the probability metric equation, analyze the probability that the i-th group contains $s_b$, in other words that it is "correct". The i-th candidate for the first symbol, $\hat{s}_1^{(i)}$, is associated with $N_2(i)$ unique values for the second symbol. The set of these unique values is called $L_i$. According to this notation the i-th group is correct when $\hat{s}_1^{(i)} = s_1$ and $s_2 \in L_i$:

$$Pr(\overline{G}_i) = Pr(\hat{s}_1^{(i)} = s_1 \cap s_2 \in L_i).$$

From Bayes' theorem this can be rewritten as:

$$Pr(\overline{G}_i) = Pr(\hat{s}_1^{(i)} = s_1) Pr(s_2 \in L_i | \hat{s}_1^{(i)} = s_1).$$

The first output of the whitened-matched filter, $y_1$ from equation (4), is a function of only the first channel input due to the lower triangular nature of the matrix R. In order to evaluate $Pr(\hat{s}_1^{(i)} = s_1)$, $y_1$ is scaled to get signal plus noise:

$$\tilde{y}_1 = \frac{y_1}{R_{1,1}} = s_1 + \frac{n_1}{R_{1,1}} = s_1 + \tilde{n}_1.$$

Figure 12:
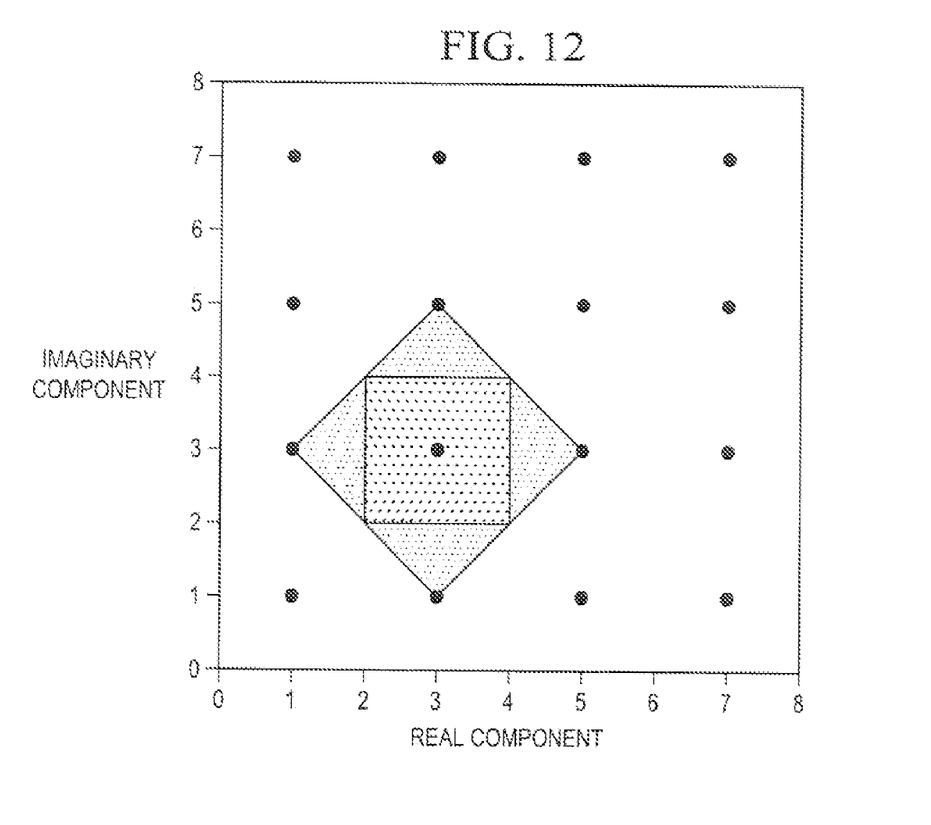
FIG. 12 illustrates example decision regions in the first quadrant of a 64-QAM constellation.

The decision $\hat{s}_1^{(i)}$, the i-th nearest symbol from the constellation to the point $\tilde{y}_1$. This means that $Pr(\hat{s}_1^{(i)} = s_1)$ decreases monotonically as i increases. In words, $\hat{s}_1^{(i)} = s_1$ if $\tilde{y}_1$ lies outside the (i−1)-th decision region, but inside the i-th decision region. FIG. 12 illustrates the decision regions for i=1 and i=2 when $s_1 = 3+j3$ from the 64-QAM constellation. If $\tilde{y}_1$ lies within the inner square, then $\hat{s}_1^{(i)} = s_1$. If $\tilde{y}_1$ lies outside the inner square, but inside the outer square then $\hat{s}_1^{(2)} = s_1$. Such decision regions can be drawn for all values of i, with each point in the 64-QAM constellation being the center. In general the following equation applies:

$$Pr(\hat{s}_1^{(i)} = s_1) = \sum_{x \in A_i} Pr(\hat{s}_1^{(i)} = s_1 | s_1 = x) Pr(s_1 = x),$$

where $A_i$ may be any symbol constellation. Since all points in a constellation are equally likely to be transmitted the equation is reduced to:

$$Pr(\hat{s}_1^{(i)} = s_1) = \frac{1}{|A_1|} \sum_{s \in A_1} Pr(\hat{s}_1^{(i)} = s_1 \mid s_1 = s).$$

However, the value of $Pr(\hat{s}_1^{(i)}=s_1|s_1=x)$ depends not only on the value of i, but also on where $s_1$ is located in the constellation. In fact, the shapes of the decision regions change only when they would extend beyond the boundaries of the constellation.

The probability distribution of $\tilde{y}_1$ given that $s_1$ is transmitted is denoted as $f_{\tilde{y}_1|s_1}(x)$. Assuming additive white Gaussian noise, $f_{\tilde{y}_1|s_1}(x)$ is a two-dimensional Gaussian function with mean $s_1$ and variance $$\frac{\sigma^2}{R_{1,1}^2}.$$

The value of $Pr(\hat{s}_1^{(i)}=s_1)$ may be computed from $$\sum_{k=1}^{i} Pr(\hat{s}_1^{(k)} = s_1),$$

which is the integral of $f_{\tilde{y}_1|s_1}(x)$ within the bounds of the border of the i-th decision region—the integral over this region produces a volume. The average value of this volume over all possible transmitted symbols is written as:

$$v_1(i, \sigma/R_{1,1}) = \sum_{k=1}^{i} Pr(\hat{s}_1^{(k)} = s_1).$$

The probability that $\hat{s}_1^{(i)}$ is correct can be expressed as a differential volume:

$$Pr(\hat{s}_1^{(i)}=s_1)=v_1(i,\sigma/R_{1,1})-v_1(i-1,\sigma/R_{1,1}),$$

where $v_1(0,x)=0$ for any x. To obtain a similar expression for the second symbol, the interference from the first symbol in the second output of the whitened-matched filter equation (4) can be cancelled to obtain:

$$\tilde{y}_2^{(i)} = \frac{y_2 - R_{2,1}\hat{s}_1^{(i)}}{R_{2,2}}$$

$$\tilde{y}_2^{(i)} = a_2 + \frac{R_{2,1}}{R_{2,2}}(s_1 - \hat{s}_1^{(i)}) + \frac{n_2}{R_{2,2}}.$$

If $\hat{s}_1^{(i)}=s_1$ this reduces to:

$$\tilde{y}_2^{(i)}=s_2+\tilde{n}_2.$$

Therefore, the probability $Pr(s_2 \in L_i|\hat{s}_i^{(i)}=s_1)$ can also be computed as an average volume:

$$v_2(\hat{s}_1^{(i)}, N_2(i), \sigma/R_{2,2}) = \sum_{k=1}^{N_2(i)} Pr(\hat{s}_2^{(k)} = s_2 \mid \hat{s}_1^{(i)} = s_1).$$

The probability that the i-th group is correct is written as a function of these volume functions as follows:

$$Pr(\overline{G}_i)=[v_1(i,\sigma/R_{1,1})-v_1(i-1,\sigma/R_{1,1})]v_2(\hat{s}_1^{(i)},i,\sigma/R_{2,2}).$$

This leads to a more useful expression of the probability metric equation (12):

$$P_c = \sum_{i=1}^{N_1} Pr(\overline{G}_i) = \sum_{i=1}^{N_1} [v_1(i, \sigma/R_{1,1}) - v_1(i-1, \sigma/R_{1,1})]v_2(\hat{s}_1^{(i)}, i, \sigma/R_{2,2}).$$

Figure 10:
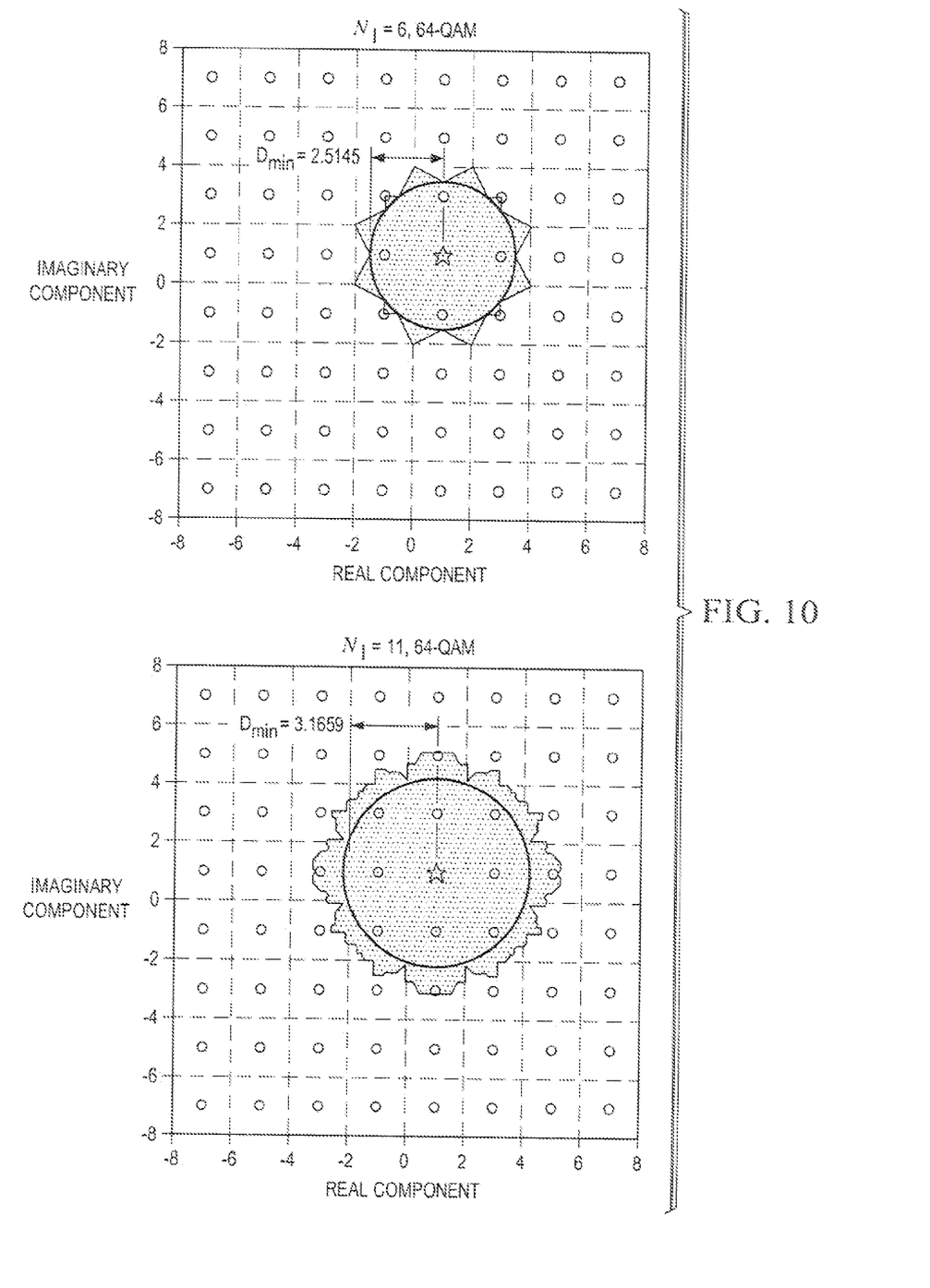
FIG. 10 illustrates example decision regions for $N_1=6$ and $N_1=11$ given internal constellation points.
Figure 11:
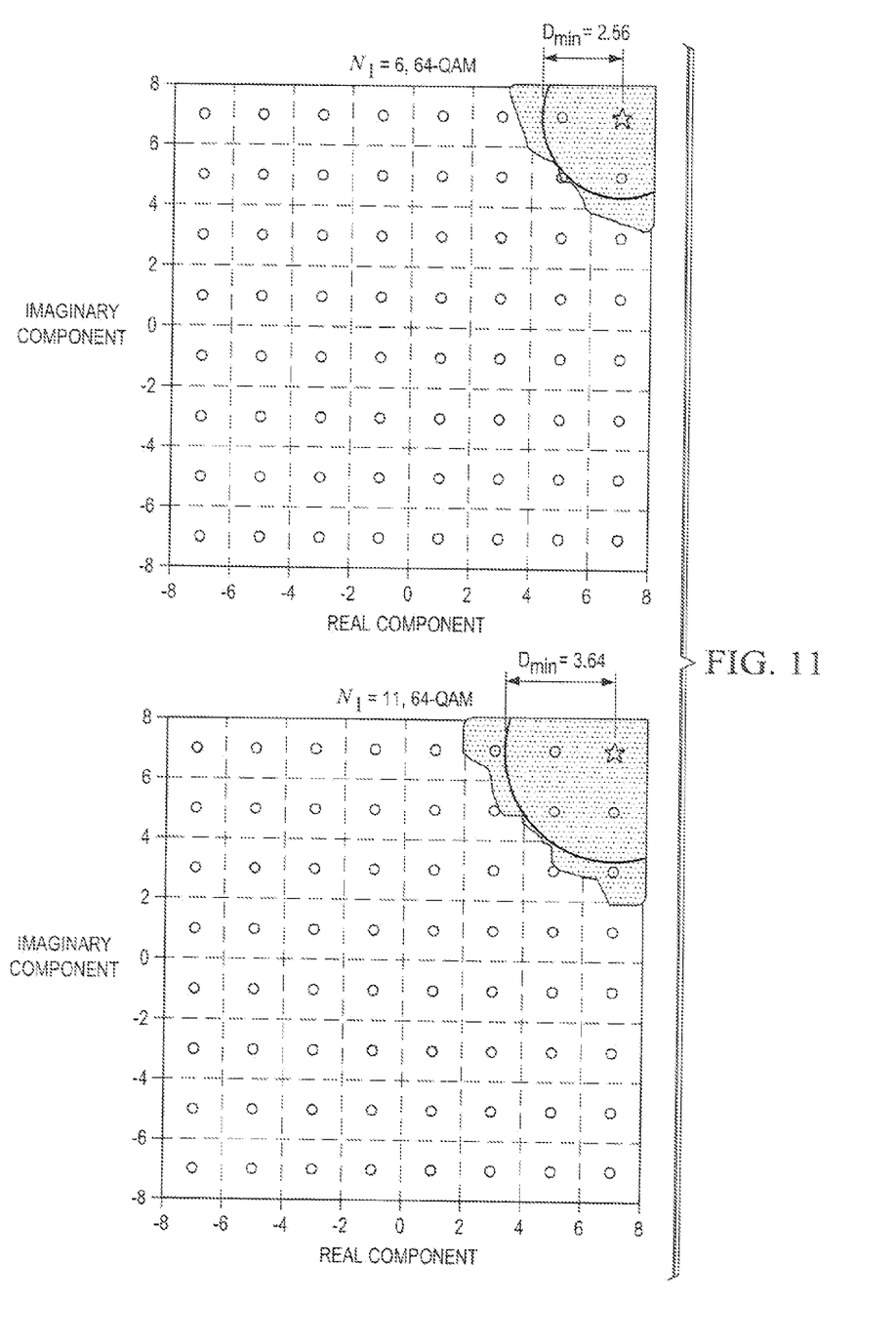
FIG. 11 illustrates example decision regions for $N_1=6$ and $N_1=11$ given external constellation points.

Understanding the probability metric equation involves understanding how to evaluate the volume functions $v_1(N_1, \sigma/R_{1,1})$ and $v_2(\hat{s}_1^{(i)}, N_2(i), \sigma/R_{2,2})$. These volume functions are closely related to the shape of the decision regions. FIG. 10 shows two example decision regions (the shaded areas) when $\hat{s}_1^{(1)}=1+j$. FIG. 10 illustrates that increasing $N_1$ from 6 to 11 basically increases the minimum distance from the decision region's center to its boundary from 2.51 to 3.17, this minimum distance $D_{min}(N_1)$ is labeled. One approximation of the decision region is a circle with radius $D_{min}(N_1)$ centered at $\hat{s}_1^{(1)}$, also illustrated in FIG. 10. The value of $D_{min}(N_1)$ depends on where $\hat{s}_1^{(1)}$ lies in the constellation. FIG. 11 shows how edge effects impact the decision region when $\hat{s}_1^{(1)}=7+j7$. Note that $D_{min}(|A_1|)=\infty$ since the decision region includes the entire constellation in this case.

Using the circular decision region approximation, the volume given a particular point in the constellation is written as:

$$v_1(N_1, \sigma/R_{1,1}) = \int_{-D_{min}(N_1)}^{D_{min}(N_1)} \int_{-D_{min}(N_1)}^{D_{min}(N_1)} \frac{R_{1,1}^2}{2\pi\sigma^2} \exp\left(\frac{-(x^2+y^2)R_{1,1}^2}{2\sigma^2}\right) dx\, dy.$$

After simple substitutions, the volume can be written as:

$$v_1(N_1, \sigma/R_{1,1}) =$$
$$\int_{-R_{1,1} \cdot D_{min}(N_1)}^{R_{1,1} \cdot D_{min}(N_1)} \int_{-R_{1,1} \cdot D_{min}(N_1)}^{R_{1,1} \cdot D_{min}(N_1)} \frac{1}{2\pi\sigma^2} \exp\left(\frac{-(x^2+y^2)}{2\sigma^2}\right) dx\, dy.$$

A similar expression can be derived for $v_2(\hat{s}_1^{(i)}, N_2(i), \sigma/R_{2,2})$.

The circular approximation provides some insight into how to approximate the volume function. The two integrals of the volume function are separable:

$$v_1(N_1, \sigma/R_{1,1}) = \int_{-R_{1,1} \cdot D_{min}(N_1)}^{R_{1,1} \cdot D_{min}(N_1)} \frac{1}{\sqrt{2\pi\sigma^2}}$$
$$\exp\left(\frac{-x^2}{2\sigma^2}\right) dx \int_{-R_{1,1} \cdot D_{min}(N_1)}^{R_{1,1} \cdot D_{min}(N_1)} \frac{1}{\sqrt{2\pi\sigma^2}} \exp\left(\frac{-y^2}{2\sigma^2}\right) dy.$$

Furthermore, the volume function can be related to the Q function:

$$v_1(N_1, \sigma/R_{1,1}) = \int_{-R_{1,1} \cdot D_{min}(N_1)/\sigma}^{R_{1,1} \cdot D_{min}(N_1)/\sigma} \frac{1}{\sqrt{2\pi}}$$
$$\exp\left(\frac{-x^2}{2}\right) dx \int_{-R_{1,1} \cdot D_{min}(N_1)/\sigma}^{R_{1,1} \cdot D_{min}(N_1)/\sigma} \frac{1}{\sqrt{2\pi}} \exp\left(\frac{-y^2}{2}\right) dy$$

$$v_1(N_1, \sigma/R_{1,1}) = (1 - 2Q(R_{1,1} \cdot D_{min}(N_1)/\sigma))^2.$$

A common approximation of the Q function follows from the Chernoff bound:

$$Q(x) = \frac{1}{\sqrt{2\pi}} \int_x^\infty \exp(-x^2/2)\,dx \approx \frac{1}{2}\exp(-x^2/2).$$

Using this approximation, the volume function can be expressed as:

$$\upsilon_1(N_1, \sigma/R_{1,1}) \approx$$
$$1 - \exp(-(R_{1,1} \cdot D_{min}(N_1)/\sigma)^2/2) + \frac{1}{4}\exp(-(R_{1,1} \cdot D_{min}(N_1)/\sigma)^2).$$

Applying the max-log approximation on top of the Chernoff approximation yields:

$$\upsilon_1(N_1,\sigma/R_{1,1}) \approx 1 - \exp(-(R_{1,1} \cdot D_{min}(N_1))^2/2\sigma^2).$$

Similarly, the second volume function is approximated as:

$$\upsilon_2(\hat{s}_1^{(i)}, N_2(i), \sigma/R_{2,2}) \approx 1 - \exp(-(R_{2,2} \cdot D_{min}(N_2(i)))^2/2\sigma^2).$$

Figure 7:
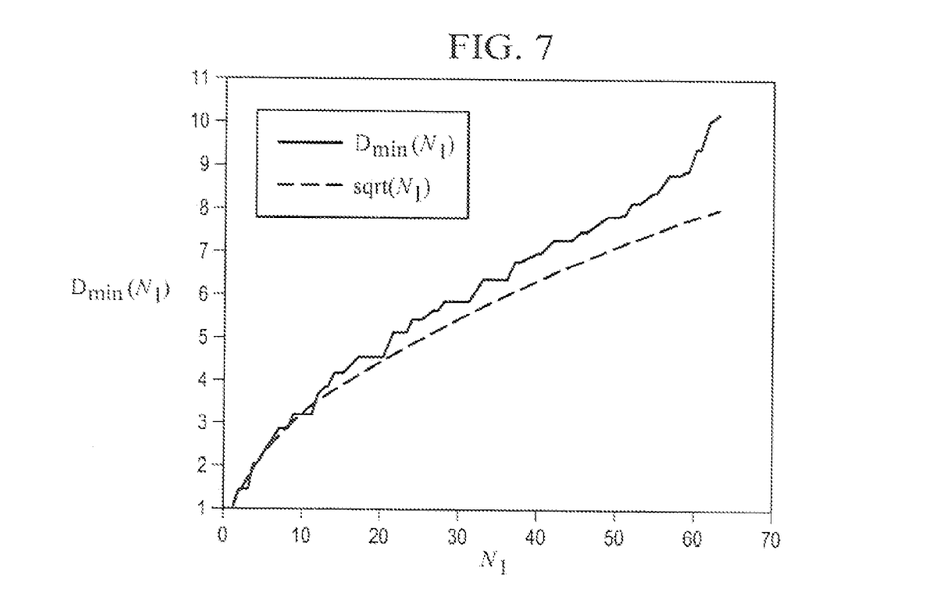
FIG. 7 shows a graph representing the numerical values of the function $Dmin(N_1)$ for 64 QAM generated by embodiments.

It should be understood that the above mathematical derivations are provided as an example, and not by way of limitation, of one way to arrive at an approximate equation for the desired or predetermined probability metric. From the above derivations of the volume functions, one approximation of $P_c$ can be written as:

$$P_c \approx \tilde{P}_c \sum_{i=1}^{N_1} \left[ \left(1 - \exp\left(\frac{-(R_{1,1} \cdot D_{min}(i))^2}{2\sigma^2}\right)\right) - \left(1 - \exp\left(\frac{-(R_{1,1} \cdot D_{min}(i-1))^2}{2\sigma^2}\right)\right)\right] \left(1 - \exp\left(\frac{-(R_{2,2} \cdot D_{min}(N_2(i)))^2}{2\sigma^2}\right)\right), \quad (13)$$

where $D_{min}(i)$ is half the minimum distance separating two neighboring points in the symbol alphabet, and $D_{min}(0)=0$. FIG. 7 illustrates the numerical values of the function $D_{min}(N_1)$, in the context of 64-QAM (quadrature amplitude modulation), and the fact that $D_{min}(N_1)=\sqrt{N_1}$ is a reasonable approximation. For ease of discussion, the following variable substitution is employed:

$$\theta(k,i) = \frac{(R_{k,k} \cdot D_{min}(i))^2}{2\sigma^2}. \quad (14)$$

With this substitution, equation (13) becomes:

$$\tilde{P}_c =$$
$$\sum_{i=1}^{N_1} [(1 - \exp(-\theta(1,i))) - (1 - \exp(-\theta(1,i-1)))][1 - \exp(-\theta(2,N_2(i)))].$$

Some embodiments do an exhaustive search over all possible values of $N_1$ and $\underline{N}_2$ that obey the constraint $$\sum_{i=1}^{N_1} N_2(i) \leq L.$$

The result of such embodiments of an exhaustive leaf-node predictor is the set of parameters that optimize $\tilde{P}_c$ as computed according to equation (13). Specifically, as shown in equation (13) $\tilde{P}_c$ is a function of $N_1$, $\underline{N}_2$, $R_{1,1}$, $R_{2,2}$, and $\sigma^2$. The values of $R_{1,1}$, $R_{2,2}$, and $\sigma^2$ are known for the given channel realization, then the parameters $N_1$ and $\underline{N}_2$ that optimize $\tilde{P}_c$ are the output of leaf-node predictor 310. Due to the high complexity, it is more practical to implement most embodiments of analytically-based leaf-node prediction off-line in advance to compute or generate a look-up table. When performed in advance, the parameters $N_1$ and $\underline{N}_2$ that optimize $\tilde{P}_c$ are preferably stored in a look-up table along with h(H) and $\sigma^2$ for a range of values of $R_{1,1}$, $R_{2,2}$, and $\sigma^2$. In practice, the range of values included in the search may comprise only one unique value $\sigma^2$ such as the reciprocal of the nominal operating signal-to-noise ratio (SNR).

Figure 8:
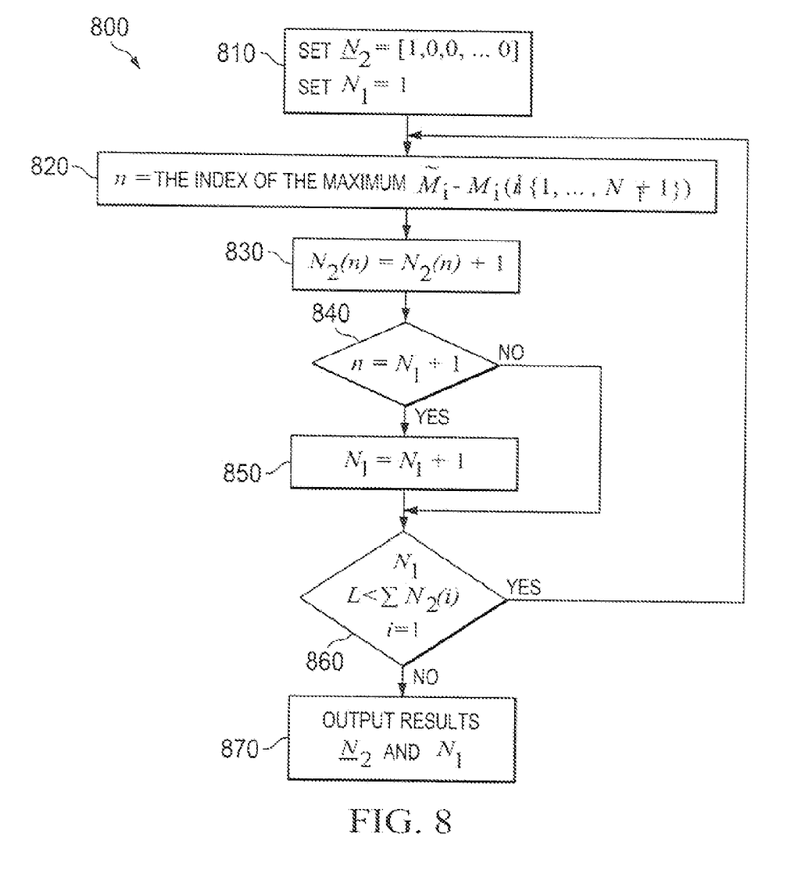
FIG. 8 illustrates a method of leaf-node prediction according to embodiments.

At least some embodiments, such as that illustrated in FIG. 8, choose the parameters $N_1$ and $\underline{N}_2$ to optimize $\tilde{P}_c$ by beginning with $\underline{N}_2=[1, 0, 0, \ldots 0]$ (block 810), and then iteratively increasing the element $N_2(i)$ that most increases or improves $\tilde{P}_c$ until $$L = \sum_{i=1}^{N_1} N_2(i)$$

(blocks 820-860). In terms of performance, it is preferred to increase the elements $N_2(i)$ by only one each time, although it should be understood that by incrementing or increasing by more than one in some embodiments may decrease complexity with an acceptable performance loss. It should be understood that in case of a tie between indices, preferably the smaller index is selected. Note that $N_1$ is the number of non-zero values in $\underline{N}_2$. Such embodiments can be implemented by independently considering the terms of the summation in equation (15):

$$\tilde{P}_c = \sum_{i=1}^{N_1} M_i, \quad (16)$$

where:

$$M_i = \begin{cases} [1 - \exp(-\theta(1,1))][1 - \exp(-\theta(2,N_2(1)))] & \text{if } i = 1 \\ [\exp(-\theta(1,i-1)) - \exp(-\theta(1,i))] \\ [1 - \exp(-\theta(2,N_2(i)))] & \text{if } i > 1. \end{cases} \quad (17)$$

Incrementing $N_2(i)$ would cause the i-th term to increase according to:

$$\tilde{M}_i = \begin{cases} [1 - \exp(-\theta(1,1))] \\ [1 - \exp(-\theta(2,N_2(1)+1))] & \text{if } i = 1 \\ [\exp(-\theta(1,i-1)) - \exp(-\theta(1,i))] \\ [1 - \exp(-\theta(2,N_2(i)+1))] & \text{if } i > 1. \end{cases} \quad (18)$$

Thus, the increase in $\tilde{P}_c$ caused by incrementing $N_2(i)$ is $\tilde{M}_i - M_i$. Next, find the element of $\underline{N}_2$ whose increase would cause the greatest increase to $\tilde{P}_c$:

$$n = \arg\max_{i=1\ldots(N_1+1)}(\tilde{M}_i - M_i) \quad (19)$$

Element $N_2(n)$ is incremented (block 830), and $N_1$ is also incremented if $n=N_1+1$ (blocks 840 and 850). The process is continued until $$L = \sum_{i=1}^{N_1} N_2(i).$$

FIG. 8 is a diagram of an embodiment of this analytically-based leaf-node prediction method.

$$\begin{aligned}
n &= \operatorname{argmax}_{i=1\ldots(N_1+1)}(\tilde{M}_i - M_i) \quad (23)\\
&= \operatorname{argmax}_{i=1\ldots(N_1+1)}\log(\tilde{M}_i - M_i)\\
&= \operatorname{argmin}_{i=1\ldots(N_1+1)} -\log(\tilde{M}_i - M_i)\\
&= \operatorname{argmin}_{i=1\ldots(N_1+1)}(\theta(2,N_2(1)), \{\theta(1,i-1)-\theta(2,N_2(i))\}_{i=2\ldots N_1}, \theta(1,N_1))\\
&\cong \operatorname{argmin}(R_{2,2}^2 \cdot D_{min}^2(N_2(1)), \{R_{2,2}^2 \cdot D_{min}^2(N_2(i)) + R_{1,1}^2 \cdot D_{min}^2(i-1)\}_{i=2\ldots N_1}, R_{1,1}^2 \cdot D_{min}^2(N_1))\\
&= \operatorname{argmin}\left(\frac{R_{2,2}^2}{R_{1,1}^2} \cdot D_{min}^2(N_2(1)), \left\{\frac{R_{2,2}^2}{R_{1,1}^2} \cdot D_{min}^2(N_2(i)) + \cdot D_{min}^2(i-1)\right\}_{i=2\ldots N_1}, D_{min}^2(N_1)\right).
\end{aligned}$$

If the leaf-node prediction algorithm is to be implemented in real-time, then it is desirable to reduce the complexity of computing equation (19). Discussion will now turn to the computation of $\tilde{M}_i - M_i$, and how to compute this difference term with less complexity. This difference term can be expressed as:

$$\tilde{M}_i - M_i = \qquad(20)$$

$$\begin{cases}
[1-\exp(-\theta(1,1))] \cdot\\
[\exp(-\theta(2,N_2(1))) - \exp(-\theta(2,N_2(1)+1))] & \text{if } i = 1\\
[\exp(-\theta(1,i-1)) - \exp(-\theta(1,i))] \cdot\\
[1-\exp(-\theta(2,1))] & \text{if } i = N_1+1\\
[\exp(-\theta(1,i-1)) - \exp(-\theta(1,i))] \cdot\\
[\exp(-\theta(2,N_2(i))) - \exp(-\theta(2,N_2(i)+1))] & \text{else.}
\end{cases}$$

These expressions can be complex to compute due to the exponential functions, but there are approximations for the exponential operation that can reduce complexity. An exemplary embodiment, which has been found to provide significant reduction in complexity while resulting in little, if any, performance degradation, is described below.

Some embodiments use a Max-Log approximation $e^{-a} - e^{-b} \cong e^{-\min(a,b)}$ to simplify the computation of equation (20) and (19):

$$\tilde{M}_i - M_i \cong \begin{cases}
[1-\exp(-\theta(1,1))] \cdot\\
\exp(-\theta(2,N_2(1))) & \text{if } i = 1\\
\exp(-\theta(1,i-1)) \cdot\\
[1-\exp(-\theta(2,1))] & \text{if } i = N_1+1\\
\exp(-\theta(1,i-1)) \cdot\\
\exp(-\theta(2,N_2(i))) & \text{else.}
\end{cases} \qquad(21)$$

By approximating $1-\exp(-x)$ as 1, the expression simplifies further:

$$\tilde{M}_i - M_i \cong \begin{cases}
\exp(-\theta(2,N_2(1))) & \text{if } i = 1\\
\exp(-\theta(1,i-1)) & \text{if } i = N_1+1\\
\exp(-\theta(1,i-1) - \theta(2,N_2(i))) & \text{else.}
\end{cases} \qquad(22)$$

Using this result, the index of the maximum $\tilde{M}_i - M_i$ as defined by equation (19), can be found without the exponential computations according to:

Equation (20) shows that the only impact that the channel has on choosing the parameters $N_1$ and $N_2$ is through the quantity $h(H) = R_{2,2}^2/R_{1,1}^2$. This implies that $R_{2,2}^2/R_{1,1}^2$ is a good channel metric for embodiments of leaf-node predictor 310. It will be appreciated that other functions with a one-to-one mapping with $R_{2,2}^2/R_{1,1}^2$ can also be used as the channel metric. Another reason why this simplification reduces complexity is that equation (20) is independent of $\sigma$.

Since the parameters chosen by the embodiment illustrated in FIG. 8 using equation (23) will be the same for all channel realizations that have the same value of $h(H)$, such embodiment could additionally or alternatively be used to generate a look-up table for a range of values of $h(H)$. Then during operation, MIMO detector 300 extracts the parameters corresponding to the value of $h(H)$ for each channel realization. In this case, the noise variance is not used for generating the look-up table.

Some embodiments use a first-order Taylor series expansion to simplify the computation of equation (21); approximating the exponential function as $e^{-x} \cong 1-x$ yields:

$$T(\tilde{M}_i - M_i) = \begin{cases}
\theta(1,1)[\theta(2,N_2(1)+1) - \theta(2,N_2(1))] & \text{if } i = 1 \quad(24)\\
[\theta(1,i) - \theta(1,i-1)]\theta(2,1) & \text{if } i = N_1+1\\
[\theta(1,i) - \theta(1,i-1)]\\
[\theta(2,N_2(i)+1) - \theta(2,N_2(i))] & \text{else.}
\end{cases}$$

Higher-order Taylor series expansions may also be used to improve the approximation, but it has been observed that such improvement comes at the cost of increasing complexity. For constructing a look-up table off-line where complexity is of little concern this is an attractive option. Substituting for $\theta(k,i)$ and factoring out common factors to the left-hand side yields:

$$(2\sigma^2)^2 \cdot T(\tilde{M}_i - M_i) = \qquad (25)$$

$$\begin{cases} (R_{1,1} \cdot D_{min}(1))^2 \\ [(R_{2,2} \cdot D_{min}(N_2(1)+1))^2 - (R_{2,2} \cdot D_{min}(N_2(1)))^2] & \text{if } i=1 \\ [(R_{1,1} \cdot D_{min}(i))^2 - (R_{1,1} \cdot D_{min}(i-1))^2] \\ (R_{2,2} \cdot D_{min}(1))^2 & \text{if } i=N_1+1 \\ [(R_{1,1} \cdot D_{min}(i))^2 - (R_{1,1} \cdot D_{min}(i-1))^2] \\ [(R_{2,2} \cdot D_{min}(N_2(i)+1))^2 - (R_{2,2} \cdot D_{min}(N_2(i)))^2] & \text{else.} \end{cases}$$

Factoring the term $R_{1,1}^2 \cdot R_{2,2}^2$ to the left-hand side and substituting $D_{min}(1)=1$ yields:

$$\tilde{T}(\tilde{M}_i - M_i) = T(\tilde{M}_i - M_i) \frac{(2\sigma^2)^2}{R_{1,1}^2 \cdot R_{2,2}^2} \qquad (26)$$

$$= \begin{cases} D_{min}^2(N_2(1)+1) - D_{min}^2(N_2(1)) & \text{if } i=1 \\ D_{min}^2(N_1+1) - D_{min}^2(N_1) & \text{if } i=N_1+1 \\ [D_{min}^2(i) - D_{min}^2(i-1)] \cdot \\ [D_{min}^2(N_2(i)+1) - D_{min}^2(N_2(i))] & \text{else.} \end{cases}$$

Embodiments employing a Taylor-series approximation have the interesting result that they always generate the same parameters $N_1$ and $N_2$ regardless of the channel realization.

Using the first-order Taylor series expansion to compute equation (19) is mathematically summarized as:

$$n = \text{argmax}_{i=1\ldots(N_1+1)}(\tilde{M}_i - M_i) \qquad (27)$$
$$\cong \text{argmax}_{i=1\ldots(N_1+1)} \tilde{T}(\tilde{M}_i - M_i).$$

Another leaf-node predictor embodiment chooses the parameters $N_1$ and $N_2$ to optimize $\tilde{P}_c$ in a different way. By assuming that all elements in $\underline{N}_2$ are uniform or equal, $N_2(i)=N_2$, equation (13) simplifies to:

$$\tilde{P}_c = \left(1 - \exp\left(\frac{-(R_{2,2} \cdot D_{min}(N_2))^2}{2\sigma^2}\right)\right) \sum_{i=1}^{N_1}$$

$$\left[\left(1 - \exp\left(\frac{-(R_{1,1} \cdot D_{min}(i))^2}{2\sigma^2}\right)\right) - \left(1 - \exp\left(\frac{-(R_{1,1} \cdot D_{min}(i-1))^2}{2\sigma^2}\right)\right)\right]$$

$$= \left(1 - \exp\left(\frac{-(R_{2,2} \cdot D_{min}(N_2))^2}{2\sigma^2}\right)\right)$$

$$\left(1 - \exp\left(\frac{-(R_{1,1} \cdot D_{min}(N_1))^2}{2\sigma^2}\right)\right).$$

The list length in these embodiments is $L=N_1 \cdot N_2$, so $N_1$ increases when $N_2$ decreases and vice versa. As a result, $\tilde{P}_c$ is maximum when $R_{2,2} \cdot D_{min}(N_2) = R_{1,1} \cdot D_{min}(N_1)$. Substituting $N_2 = L/N_1$ into this equation yields a simple equation for $N_1$, namely:

$$N_1 = D_{min}^{-1}\left(\frac{R_{2,2}}{R_{1,1}} \cdot D_{min}\left(\frac{L}{N_1}\right)\right) \qquad (29)$$

$$\cong \left(\frac{R_{2,2}}{R_{1,1}} \cdot \sqrt{\frac{L}{N_1}}\right)^2$$

$$= \left(\frac{R_{2,2}}{R_{1,1}}\right)^2 \frac{L}{N_1}.$$

where $D_{min}(x) \approx \sqrt{x}$ is employed. This gives a simple equation for generating $N_1$ for a given channel realization:

$$N_1 = \frac{R_{2,2}}{R_{1,1}} \sqrt{L}. \qquad (30)$$

Equation (30) is preferably not used as is, because $N_1$ should be an integer less than or equal to the list length. The maximum size of $N_1$ may also be restricted as follows:

$$N_1 = \min\left(\left\lceil \frac{R_{2,2}}{R_{1,1}} \sqrt{L} \right\rceil, N_{1,max}(L)\right), \qquad (31)$$

so that $N_1 \leq N_{1,max}(L)$ is certain, and where $\lceil x \rceil$ is the integer closest to x that is also greater than or equal to x. The specific value of $N_{1,max}(L)$ may be chosen to achieve a favorable performance-complexity trade-off, as long as $N_{1,max}(L) \leq |A_1|$. Once $N_1$ has been computed or generated, then the elements of $\underline{N}_2$ may be set as close as possible to $L/N_1$. Since the elements of $\underline{N}_2$ are preferably positive integers, some elements of $\underline{N}_2$ are preferably incremented or decremented from the default value of the integer nearest $L/N_1$. While satisfying the constraint $$L = \sum_{i=1}^{N_1} N_2(i),$$

preferably $N_2(i) \leq N_2(j)$ when $i > j$.

Although equation (30) was derived assuming $N_2(i)=N_2$, some embodiments compute different values of $N_2(i)$ for each value of i. Equation (30) may be used to compute $N_1$, while the elements of $\underline{N}_2$ may be computed using a different algorithm (for example, equation (32) below), or simply taken from a look-up table where a $\underline{N}_2$ vector is stored for each value of $N_1$. Equation (32) provides a simple computation for elements of $\underline{N}_2$ given $N_1$ and L. It is often preferable to explore more candidates for the most likely candidates of the first symbol, by making $N_2(i) \leq N_2(j)$ when $i>j$. The factor $\alpha_i$ can be used to accomplish this, if it decreases as i increases, or $\alpha_i$ may also be a constant.

$$N_2(i) = \begin{cases} \text{round}\left(\dfrac{L - N_1 + i - 1 - \sum_{k=1}^{i-1} N_2(k)}{N_1 + i - 1} \alpha_i\right) & \text{if } i < N_1 \\ L - \sum_{k=1}^{N_1} N_2(k) & \text{if } i = N_1. \end{cases} \quad (32)$$

The notation round(x) indicates the integer nearest x.

Consider now MIMO engine 320. There are at least two different embodiments of this MIMO engine; some of which are when a triangular matrix R is input, and some of which are when a full matrix H is input. In the following discussion, the MIMO engine is defined as having the matrix R is input. Later in this disclosure embodiments are considered where the MIMO engine is defined when the matrix H is input. Note that any MIMO engine 320 embodiment that currently exists or is developed in the future can be coupled to the leaf-node predictor 310; it is preferred that it take the inputs $N_1$ and $N_2$ and compute a list $\mathcal{L}$ and the cost of each of the L elements in the list.

First consider embodiments of MIMO engine 320 when a triangular matrix R is input along with the MIMO equalizer output y. The instructions input into MIMO engine 320 from LNP 310 are in the form of two (2) parameters. The first parameter is an integer $N_1$ which instructs MIMO engine 320 to enumerate the $N_1$ best symbol values for the first symbol $s_1$ and compute the score of each value. MIMO engine 320 thus computes $\text{Score}_{1,i} = |y_1 - R_{1,1} \hat{s}_{1,i}|^2$ for $i=1$ to $N_1$, where $\hat{s}_{1,i}$ is the i-th best estimate of $s_1$. The second parameter input into MIMO engine 320 is a vector of integers $\underline{N_2} = [N_2(1) \; N_2(2) \ldots N_2(N_1)]$, which instructs MIMO engine 320 to enumerate the $N_2(i)$ best symbol values for the second symbol $s_2$ assuming that $s_1 = \hat{s}_{1,i}$. Therefore, MIMO engine 320 computes; $z_{2,i} = y_2 - R_{2,1}\hat{s}_{1,i}$ and $\text{Score}_{2,i,j} = |z_{2,i} - R_{2,2} \hat{s}_{2,i,j}|^2$ for $i=1$ to $N_1$ and for $j=1$ to $N_2(i)$, where $\hat{s}_{2,i,j}$ is the j-th best estimate of $s_2$ assuming $s_1 = \hat{s}_{1,i}$. The final outputs of MIMO engine 320 are the set of costs, $\mathcal{L}_c = \{\text{Score}_{i,j} + \text{Score}_{2,i,j}\}$, and the set of enumerated possible channel inputs $$L = \left\{ \begin{bmatrix} \hat{s}_{1,i} \\ \hat{s}_{2,i,j} \end{bmatrix} \right\}.$$

MIMO engine 320 uses a constellation-sorting function to decide on the i-th best candidate for a given symbol. In tree-search terminology, this is the same as computing the i-th best branch exiting a given node. MIMO engine 320 of LNP detector 300 can use any constellation-sorting function to determine the $N_1$ or $N_2(i)$ best branches (or symbols) to enumerate from a given node in the tree. A generic function to represent this sorting operation is preferably defined:

$$\mathfrak{f}(y,R,A,i) = \text{i-th best candidate from the alphabet } A. \quad (33)$$

There are many ways to implement this sorting operation, and LNP detector 300 will work with any of them—even suboptimal sorting operations. Another, and possibly more intuitive, way of expressing equation (8) would be:

$$\mathfrak{f}(y,R,A,i) = \text{i-th nearest symbol to } y/R \text{ in } A. \quad (34)$$

The i-th best candidate for the first symbol is therefore expressed as $\mathfrak{f}(y_1, R_{1,1}, A_1, i)$.

For the i-th candidate of the first symbol, MIMO engine 320 computes the cost of the leaf nodes corresponding to the $N_2(i)$ best values of the second symbol. This computation preferably employs interference cancellation that assumes that the i-th candidate for the first symbol is the actual channel input. The result of this interference cancellation is defined in equation (9). For the N=2 special case, the interference result can be written as:

$$z = y_2 - R_{2,1}\hat{s}_1. \quad (35)$$

The i-th best candidate for the second symbol, when the candidate for the first symbol is $\hat{s}_1$ is preferably computed using the constellation sorting function $\mathfrak{f}(z, R_{2,2}, A_2, i)$.

One output of MIMO engine 320 is a list of candidate vectors, $\mathcal{L}$, which correspond to the leaf nodes specified by the input parameters $N_1$ and $\underline{N_2}$. Another output is the cost of each of the candidate vectors in the output list, the list of costs is labeled as $\mathcal{L}_c$. Returning momentarily to the example tree diagram of FIG. 1, it can be seen that $N_1=4$, and $\underline{N_2}=[4\;3\;2\;1]$. The leaf nodes that are enumerated in that example are indicated with solid lines.

The score of a particular symbol can be defined in multiple ways. A generic function to represent this operation is:

$$g(y,R,\hat{s}) = \text{score of the symbol } \hat{s}. \quad (36)$$

One definition of this function is the mean-squared error:

$$g(y,R,\hat{s}) = |y - R\hat{s}|^p, \quad (37)$$

where preferably p=2, but other values like p=1 may also be used to reduce complexity. Other possible definitions include approximations of the above definition that may be less complex to compute, as well as mathematically equivalent expressions that may be less complex to compute.

For a generic set of input parameters $N_1$ and $\underline{N_2}$, MIMO engine 320 can be described by the following exemplary pseudocode. It will be appreciated by one skilled in the art that such exemplary pseudocode is provided strictly as an example, and not by way of limitation, as it can be rewritten with different pseudocode that is functionally equivalent. It should be further appreciated that MIMO engine 320 as modeled by this pseudocode may alternatively be implemented using hardware, or a combination of hardware and software.

| The MIMO Engine (Given R and y) |
| --- |
| 1. for i = 1 to $N_1$ |
| 2.    $\hat{s}_1 = \mathfrak{f}(y_1, R_{1,1}, A_1, i)$ |
| 3.    $z = y_2 - R_{2,1}\hat{s}_1$ |
| 4.    Compute the score of $\hat{s}_1$, $c_1 = g(y_1, R_{1,1}, \hat{s}_1)$. |
| 5.    for j = 1 to $N_2(i)$ |
| 6.       $\hat{s}_2 = \mathfrak{f}(z, R_{2,2}, A_2, j)$ |
| 7.       Add the candidate vector $\begin{bmatrix}\hat{s}_1\\\hat{s}_2\end{bmatrix}$ to the list $\mathcal{L}$. |
| 8.       Compute the score of the candidate vector: $c_2 = g(z, R_{2,2}, \hat{s}_2)$. |
| 9.       Add the cost of the candidate vector $c = c_1 + c_2$, to the set of output costs $\mathcal{L}_c$. |
| 10.    end |
| 11. end |

Now consider embodiments of MIMO engine 320 when a full matrix H is input along with the channel output r. In this case, MIMO engine 320 operates differently. Specifically, the cost computation is not separated into two score computations.

Instead each candidate in the list is constructed, and then its cost is directly computed. Otherwise, MIMO engine 320 operates very much as previously described. The following pseudocode gives an example of one way the MIMO engine may operate when it is given H and r.

| The MIMO Engine (Given H and r) |
| --- |
| 1. $y_1$ = first output of linear detector, for example $y_1$ may be the first element in the vector y, where $y = (\tilde{H}^H \tilde{H} + \alpha^2 \hat{\sigma}^2 I)^{-1} \tilde{H}^H r$, where $\tilde{H} = H\Pi$. |
| 2. for $i = 1$ to $N_1$ |
| 3. $\quad \hat{s}_1 = f(y_1, 1, A_1, i)$ |
| 4. $\quad z = \dfrac{\tilde{h}_2^H}{\tilde{h}_2^H \tilde{h}_2}(r - \tilde{h}_1 \hat{s}_1)$, where $\tilde{H} = [\,\tilde{h}_1 \; \tilde{h}_2\,]$ |
| 5. $\quad$ for $j = 1$ to $N_2(i)$ |
| 6. $\quad\quad \hat{s}_2 = f(z, 1, A_2, j)$ |
| 7. $\quad\quad$ Add the candidate vector $\begin{bmatrix} \hat{s}_1 \\ \hat{s}_2 \end{bmatrix}$ to the list $\mathcal{L}$. |
| 8. $\quad\quad$ Compute the cost of the candidate vector: $c = g\!\left(r, H, \begin{bmatrix} \hat{s}_1 \\ \hat{s}_2 \end{bmatrix}\right)$, where $c = g\!\left(r, H, \begin{bmatrix} \hat{s}_1 \\ \hat{s}_2 \end{bmatrix}\right)$ is preferably defined as $g\!\left(r, H, \begin{bmatrix} \hat{s}_1 \\ \hat{s}_2 \end{bmatrix}\right) = \left\| r - \tilde{H} \begin{bmatrix} \hat{s}_1 \\ \hat{s}_2 \end{bmatrix} \right\|^2 .$ |
| 9. $\quad\quad$ Add the cost of the candidate vector c, to the set of output costs $\mathcal{L}_c$. |
| 10. $\quad$ end |
| 11. end |

Figure 9:
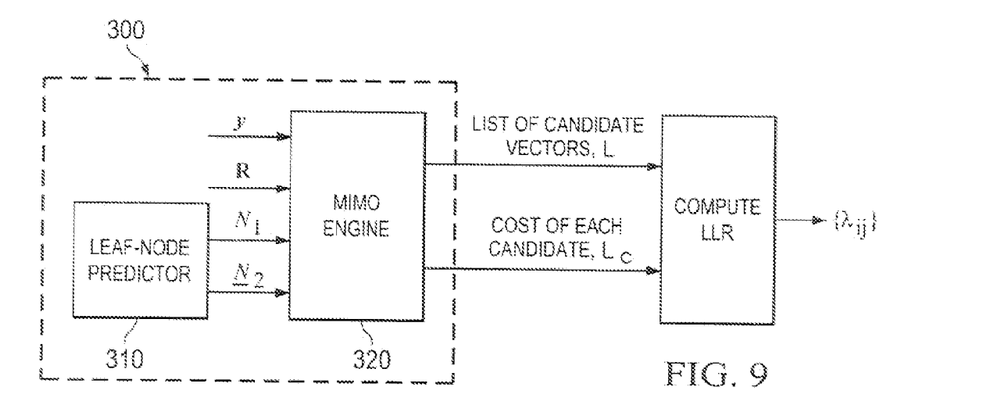
FIG. 9 illustrates a block diagram of an exemplary LNP detector, for computing LLR values, in which embodiments may be used to advantage.

MIMO engine 320 and leaf-node predictor 310 together make up the LNP detector 300. In one embodiment, such as that illustrated in the block diagram of FIG. 9, the outputs from MIMO engine 320 could be used to compute the log-likelihood ratio (LLR) values of each bit. Leaf node predictor 310 provides inputs to MIMO engine 320, which in turn generates a list of candidate vectors $\mathcal{L}$, and the cost of each candidate $\mathcal{L}_c$. These outputs are used to compute LLR values; this is a preferable embodiment for MIMO channels with two inputs. In another embodiment, the MIMO detector that is processing a channel with more than two inputs may use embodiments of the LNP detector to generate one or more lists of two-dimensional candidate vectors, which can then be used to implement a MIMO detector for a channel with more than two inputs.

Many modifications and other embodiments of the invention will come to mind to one skilled in the art to which this invention pertains having the benefit of the teachings presented in the foregoing descriptions, and the associated drawings. Therefore, the above discussion is meant to be illustrative of the principles and various embodiments of the disclosure; it is to be understood that the invention is not to be limited to the specific embodiments disclosed. Although specific terms are employed herein, they are used in a generic and descriptive sense only and not for purposes of limitation. It is intended that the following claims be interpreted to embrace all such variations and modifications.

What is claimed is:

1. A method for building a look-up table for a receiver, comprising:
    simulating a multiple-input multiple-output (MIMO) detector over a plurality of channel realizations, wherein the MIMO detector used by the simulator is known to have achieved a desired performance;
    tracking channel metric and parameter values used for each channel realization resulting from such simulating;
    determining a plurality of the best values from the tracked values comprising:
        determining a first parameter value equal to a mean of a set of tracked first parameter values for a particular channel realization;
        determining a second parameter value equal to the mean of a set of tracked second parameter values for the particular channel realization, the first and second parameter values each rounded to an integer; and
    storing, in a sparsely populated look-up table, the plurality of best values of the tracked values used for a particular channel metric.

2. The method of claim 1, wherein the tracking channel metric and parameter values, further comprises tracking channel metric and parameter values without regard to noise variance.

3. A method for building a look-up table for a receiver, comprising:
    simulating a multiple-input multiple-output (MIMO) detector over a plurality of channel realizations, wherein the MIMO detector used by the simulator is known to have achieved a desired performance;
    tracking channel metric and parameter values used for each channel realization resulting from such simulating;
    determining a plurality of the best values from the tracked values comprising:
        determining a first parameter value equal to a median of a set of tracked first parameter values for a particular channel realization;
        determining a second parameter value equal to the median of a set of tracked second parameter values for the particular channel realization; and
    storing, in a sparsely populated look-up table, the plurality of best values of the tracked values used for a particular channel metric.

4. A method for building a look-up table for a receiver, comprising:
    simulating a multiple-input multiple-output (MIMO) detector over a plurality of channel realizations, wherein the MIMO detector used by the simulator is known to have achieved a desired performance;
    tracking channel metric and parameter values used for each channel realization resulting from such simulating;
    determining a plurality of the best values from the tracked values comprising determining a first parameter value equal to a maximum value of a set of tracked first parameter values for a particular channel realization, and a corresponding resulting second parameter value; and
    storing, in a sparsely populated look-up table, the plurality of best values of the tracked values used for a particular channel metric.

* * * * *